3,072,532
ADMINISTRATION OF ENZYMIC COMPOSITION
Irving Innerfield, 20 Knickerbocker Road, Tenafly, N.J.
No Drawing. Filed Nov. 4, 1958, Ser. No. 771,740
2 Claims. (Cl. 167—73)

This invention relates to chemotherapy and aims to provide a new method of introducing a therapeutically active proteolytic substance into the body through mucosal tissue (buccally).

It is frequently desirable in the treatment of various physical disorders to increase the proteolytic enzyme content and activity at the site of the disorder. This can be done through the introduction into the systemic circulation of a proteolytic substance. Prior to my invention, this was accomplished through the intramuscular injection of a fluid preparation containing a protease. Such a preparation was made by suspending the desired quantity of a protease in an oil such as sesame oil or by incorporating the protease in physiological saline. The administration of a protease through intramuscular injection is subject to serious disadvantages. It is painful, requires a visit to or attendance by a physician for each treatment, and, when an aqueous material such as physiological saline is employed, it is necessary to prepare a fresh batch just before injection as deterioration and loss of efficacy of a protease in the presence of water is rapid.

I have made the surprising discovery that a safe but effective quantity of a therapeutically active proteolytic substance can be easily introduced into systemic circulation by a patient personally without undue discomfort. This may be accomplished by incorporating a dosage quantity of a protease in a pharmaceutically acceptable carrier that can be readily introduced into the mouth and held in the buccal cavity where the therapeutically active proteolytic substance will gradually penetrate the buccal mucosa and thus be introduced into the patient's circulatory system. Preferably, such a carrier consists of, or includes, a water-soluble, stabilizing and solubilizing agent. Such administration may be safely continued at fairly frequent intervals so that the desired proteolytic enzyme content of the patients bloodstream may be maintained over a substantial period of time.

The proteases that can be employed to introduce a therapeutically active proteolytic substance into the systemic circulation as a result of my invention will not, under normal conditions, penetrate mucous membrane. However, when they are held in contact with such membrane in the presence of body fluid such as saliva, a therapeutically active proteolytic substance will enter the bloodstream through this route. I believe this to be due to the fact that the molecules of the proteolytic materials in question are too large to penetrate the intercellular space or pores in normal mucous membrane. However, protease in the presence of body fluid is evidently adapted to act so as to increase the permeability or porosity of mucous membrane sufficiently to permit penetration of therapeutically active enzymic material into the body.

Protease, while subject to rapid deterioration in an aqueous medium, is stable in dry form. For convenience in dispensing and administration, the protease used in the practice of my invention can be enclosed in an ordinary gelatin type of capsule. However, I prefer to incorporate such protease in a tablet which can be readily introduced into the mouth and held in the buccal pouch until dissolved in the saliva present and penetration of the buccal mucosa by the therapeutically active enzymic substance has been accomplished. Ordinary tableting procedure can be followed, using excipients such as starch, soluble starch, lactose, magnesium oxide, magnesium carbonate, magnesium hydroxide, aluminum hydroxide, galactose, dextrin, dextrose and like substances normally employed in pharmacological practice.

I prefer to include with the excipients that are used, and as part of the carrier for the protease, a water-soluble, stabilizing and solubilizing agent. The one which I now prefer is "Carbowax," a solid polyethylene glycol having a molecular weight within the range of about 1500 to about 4000. I have found that this substance augments the stability of my composition and causes it to dissolve readily when it is administered. Other water-soluble, stabilizing and solubilizing agents that may be employed are a gum, such as karaya, tragacanth, agar, gum arabic, Indian gum, cherry gum and plum gum; a carbohydrate and derivatives thereof such as sorbitol, sorbitol laurate, sorbose, sorbitan, mannitol, mannitol laurate, mannitan, dulcitol, dextrose, soluble starch, dextrin, levulose, inositol, arabinose and beta lactose; and methyl cellulose, gelatin and sodium chloride.

The protease that I employ as the active ingredient in the practice of my invention may be of animal, plant, bacterial or fungal origin. Exemplary thereof are trypsin, pepsin, chymotrypsin, papain, bromelin, ficin, protease recovered from a culture broth of *Bacillus subtilis*, protease recovered from a culture broth of *Aspergillus niger* and protease recovered from a culture broth of *Trichophyton gypseum*.

The quantity of protease constituting an effective dosage unit will vary according to the particular protease selected and the purity thereof, and ranges from about 0.5 to 15.0 mgs. per dosage unit, the amount selected in any given case being measured preferably in terms of proteolytic activity. Such activity can be readily determined according to the method described in D. G. Evans, "Gelatinolytic Enzymes," Journal of General Microbiology, vol. 1, page 378, 1948. Since trypsin is obtainable in crystalline form, it can be used as the yardstick against which the proteolytic activities of the other proteases are measured. Thus, when so measured, while the protease obtained from a culture broth of *Bacillus subtillis* shows about the same order of proteolytic activity as trypsin, the proteolytic activity of papain is about half the proteolytic activity of the same amount by weight of trypsin. The degree of proteolytic activity per dosage unit that I prefer to employ in the practice of my invention is that falling within the range of proteolytic activity exhibited by 2.5 to 5 mgm. of trypsin.

In order that my invention will be fully available to those skilled in the art, specific preparations illustrating the practice thereof are described briefly:

Example I 5 mgm. trypsin and 100 mgm. "carbowax 4000" are thoroughly admixed and the admixture thus produced is tableted.

Example II 5 mgm. trypsin and 100 mgm. beta lactose are thoroughly admixed and the admixture thus produced is tableted.

This application is a continuation-in-part of my pending application, Serial No. 520,165, filed July 5, 1955, now abandoned. My said application, Serial No. 520,165, is in turn a continuation-in-part of my application, Serial No. 463,328, filed October 19, 1954, and my application, Serial No. 485,594, filed February 1, 1955, which were copending therewith and each of which is now abandoned.

What I claim is:

1. The method of introducing a therapeutically active enzymic material into the systemic circulation of a subject which comprises placing a dosage quantity of a protease in contact with mucous membrane and maintaining the protease in contact with said membrane in the presence of body fluid until said therapeutically active enzymic material is absorbed by said subject.

2. A method for the administration of a chemotherapeutic composition containing from 0.5 mgm. to 15.0 mgm. of a protease as the essential active constituent which consists in placement and retention thereof buccally.

References Cited in the file of this patent

UNITED STATES PATENTS

| | | |
|---|---|---|
| 2,527,686 | Sandberg | Oct. 31, 1950 |
| 3,019,167 | Innerfield | Jan. 30, 1962 |

OTHER REFERENCES

U.S. Dispensatory, 24th ed., 1947, pp. 816–818.

Lesser: Drug & Cosmetic Ind., 71: 2, pp. 178, 179, 250–254.

Innerfield et al.: Jour. Clin. Invest, 31: 12, pp. 1049–1055, December 1952.

Jour. Clin. Endocrinology, 8: 10, pp. 884–886, October 1948.

Taylor et al.: J.A.M.A. 155: 4, pp. 347–351, May 22, 1954.

Hardy et al.: Surg., Gyn. & Obstet., 100: 1, pp. 91–96, January 1955.